United States Patent
Bennett, III et al.

(10) Patent No.: US 7,349,682 B1
(45) Date of Patent: Mar. 25, 2008

(54) HOME GATEWAY SYSTEM FOR AUTOMATION AND SECURITY

(75) Inventors: Raymond Walden Bennett, III, Naperville, IL (US); Robert Wesley Bossemeyer, Jr., St. Charles, IL (US); Donald Bernard Liebrecht, West Dundee, IL (US); Barry James Sullivan, Long Grove, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 09/096,560

(22) Filed: Jun. 12, 1998

(51) Int. Cl.
H04J 15/00 (2006.01)
H04Q 7/38 (2006.01)
H04M 1/64 (2006.01)
H04M 15/06 (2006.01)
G08B 29/00 (2006.01)

(52) U.S. Cl. ............ 455/403; 340/534; 340/545; 370/142; 370/493; 395/186; 700/83

(58) Field of Classification Search ........ 455/558, 455/403; 370/277, 142, 493; 340/534, 545, 340/506; 395/186; 700/93, 277, 83; 379/88.1, 379/88.02
See application file for complete search history.

(56) References Cited

U.S. PATENT DOCUMENTS

| | | | |
|---|---|---|---|
| 4,511,886 A * | 4/1985 | Rodriquez | 340/534 |
| 4,683,460 A * | 7/1987 | Nakatsugawa | 340/545 |
| 5,086,385 A * | 2/1992 | Launey et al. | 700/83 |
| 5,291,479 A | 3/1994 | Vaziri et al. | 370/58.2 |
| 5,469,496 A | 11/1995 | Emory et al. | 379/58 |
| 5,475,735 A * | 12/1995 | Williams et al. | 455/403 |
| 5,479,491 A | 12/1995 | Herrero Garcia et al. | 379/88 |
| 5,526,413 A | 6/1996 | Cheston et al. | 379/201 |
| 5,528,285 A | 6/1996 | Morikawa et al. | 348/14 |
| 5,528,666 A | 6/1996 | Weigand et al. | 379/58 |
| 5,742,756 A * | 4/1998 | Dillaway et al. | 395/186 |
| 5,971,597 A * | 10/1999 | Baldwin et al. | 700/277 |
| 6,021,324 A * | 2/2000 | Sizer, II et al. | 455/403 |
| 6,058,104 A * | 5/2000 | Snelling et al. | 370/227 |
| 6,141,356 A * | 10/2000 | Gorman | 370/493 |
| 6,226,368 B1 * | 5/2001 | Teich et al. | 379/142 |
| 7,027,566 B2 * | 4/2006 | Bossemeyer et al. | 379/88.02 |
| 2006/0140356 A1 * | 6/2006 | Bossemeyer et al. | 379/88.1 |
| 2006/0220830 A1 * | 10/2006 | Bennett et al. | 340/506 |

FOREIGN PATENT DOCUMENTS

| | | | |
|---|---|---|---|
| DE | 3529167 | * | 2/1987 |
| JP | 07103493 | * | 4/1995 |
| WO | WO 99/53654 | * | 10/1999 |

OTHER PUBLICATIONS

Web Page: http://www.att.com/community guide/bpdiagrams, May 1997.
Lucent Technologies, *Bell Labs Trends and Development*, ed.Patrick Regan, Apr. 1997, vol. 1, pp. 1-11.
The Yankee group, *Consumer Communications*, Bullitan vol. 14, No. 2, Mar. 1997.
Reitman, *AT&T Announces Fixed Wireless Alternative to Local Service*, EDGE Publishing, Mar. 3, 1997, vol. 12, pp. 1-5.

* cited by examiner

*Primary Examiner*—William D. Cumming
(74) *Attorney, Agent, or Firm*—Hanley, Flight & Zimmerman, LLC

(57) ABSTRACT

The home gateway system (60) for home automation and security has a wireless local loop transceiver (62). A home automation controller (64) is capable of sending and receiving a message with the wireless local loop transceiver (62). A home security controller (66) is capable of sending and receiving a message with the wireless local loop transceiver (62) and the home automation controller (64).

10 Claims, 8 Drawing Sheets

US 7,349,682 B1

HOME GATEWAY SYSTEM FOR AUTOMATION AND SECURITY

FIELD OF THE INVENTION

The present invention relates to home automation and security systems and more particularly to a home gateway system for home automation and security.

BACKGROUND OF THE INVENTION

Because of increased security concerns many home owners have a home security system. In addition, many home owners have a variety of machines for receiving information services, such as a cable receiver box, several telephones, an answering machine, a caller ID box, a home Local Area Network (LAN), and a dial up connection to the internet. Unfortunately, only minimal integration has occurred between the security system and these information services. A number of additional features could be provided to a home owner if these services were integrated.

Thus there exists a need for a home gateway system that can integrate the security and home automation features with the information services already found in many homes.

DETAILED DESCRIPTION OF THE DRAWINGS

The home gateway system for home automation and security has a wireless local loop transceiver. A home automation controller is capable of sending and receiving a message with the wireless local transceiver. A home security controller is capable of sending and receiving a message with the wireless local loop transceiver and the home automation controller. The home gateway system for home automation and security integrates the home automation, home security and with a wireless local loop transceiver. This allows the security system and the automation system to be activated, deactivated and monitored remotely.

Figure 1:
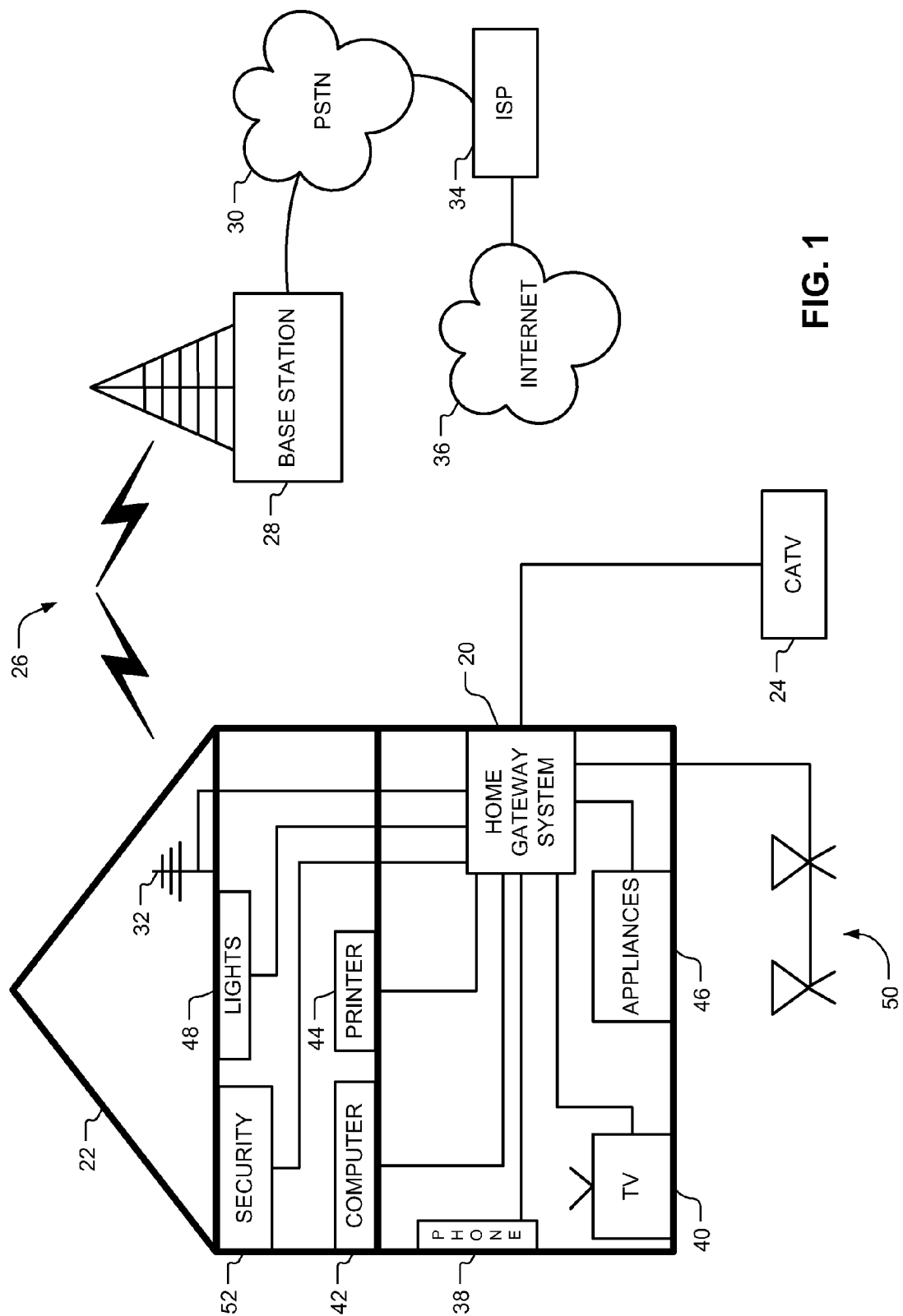
FIG. 1 is a schematic diagram of a home gateway system for home automation and security in accordance with one embodiment of the invention.

FIG. 1 is a schematic diagram of a home gateway system for home automation and security in accordance with one embodiment of the invention. The home gateway system 20 is located inside a house 22. The home gateway system 20 has an input to receive a cable television 24 input signal. The home gateway system 20 is also connected by a wireless local loop 26 and a base station 28 to the public switch telephone network (PSTN) 30. The antenna 32 for the wireless local loop 26 is shown in the attic of the house. The PSTN 30 provides access to an internet service provider (ISP) 34, which provides access to the internet 36. A telephone 38, television 40, computer 42, printer 44 can all be connected to the home gateway system 20. In addition, appliances 46, lights 48 and sprinkling systems 50 can be connected to the home gateway system as part of the home automation features. A home security system 52 can also be connected to the home gateway system 20. This allows the home automation and security features to be integrated into the home communication system. For instance, the computer 42 can be used to setup times of day for the sprinkling system to turn on or the computer can print a report of the activities of the appliances or the security systems.

Figure 2:
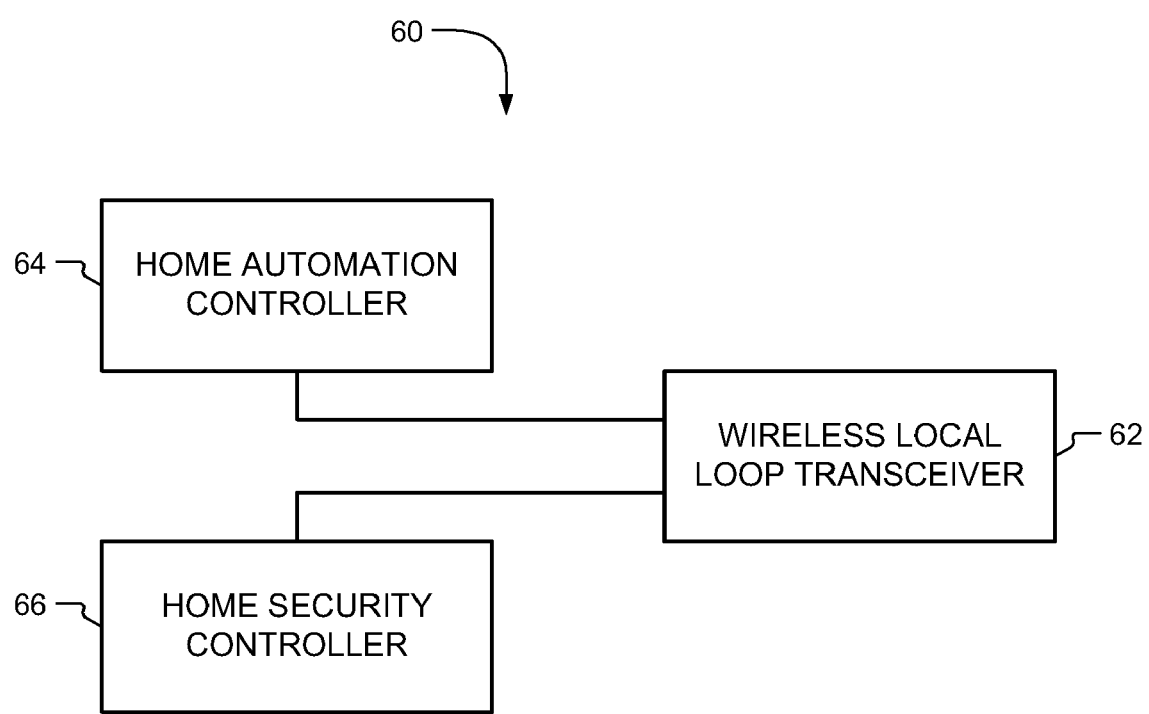
FIG. 2 is a block diagram of a home gateway system for home automation and security in accordance with one embodiment of the invention.

FIG. 2 is a block diagram of a home gateway system 60 for home automation and security in accordance with one embodiment of the invention. The home gateway system 60 has a wireless local loop transceiver 62. A home automation controller 64 is capable of sending and receiving messages from the wireless local loop transceiver 62. A home security controller 66 is capable of sending and receiving messages from the wireless local loop transceiver 62.

Figure 3:
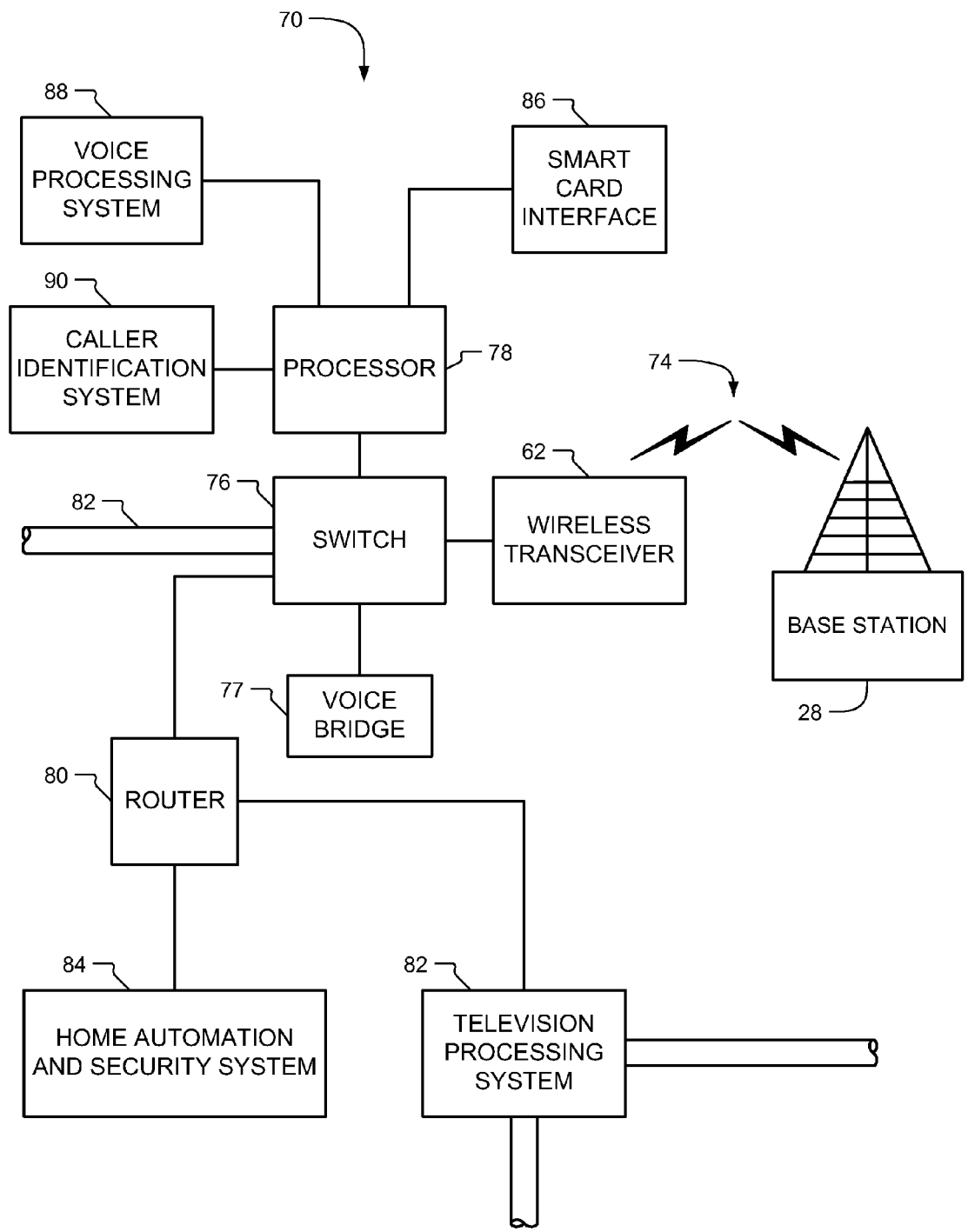
FIG. 3 is a block diagram of a home gateway system for home automation and security in accordance with one embodiment of the invention.

FIG. 3 is a block diagram of a home gateway system 70 for home automation and security in accordance with one embodiment of the invention. In this embodiment the transceiver 72 establishes a wireless local loop connection 74 with a base station 28. The transceiver 72 is connected to a switch 76. The switch 76 is connected to a voice bridge 77, a processor 78 and a router 80. The switch 76 also has a plurality of input lines 82. Telephones, facsimile machines and modems are among the devices that can be connected to the switch 76. The router 80 allows a user to establish a local area network within his home. The router 80 in this embodiment is connected to a television processing system 82 and a home automation and security system 84. The processor 78 is connected to a smart card interface 86. The smart card interface is used as a keyless entry and to store certain home automation setups. A voice processing system 88 is connected to the processor 78. The voice processing system 88 includes voice verification and speech recognition capabilities. The voice verification capability is used for remote access to the home automation and security system or is used for keyless entry. A caller identification system 90 is connected to the processor 78. The caller identification system 90 can be used as part of a remote access screening.

Figure 4:
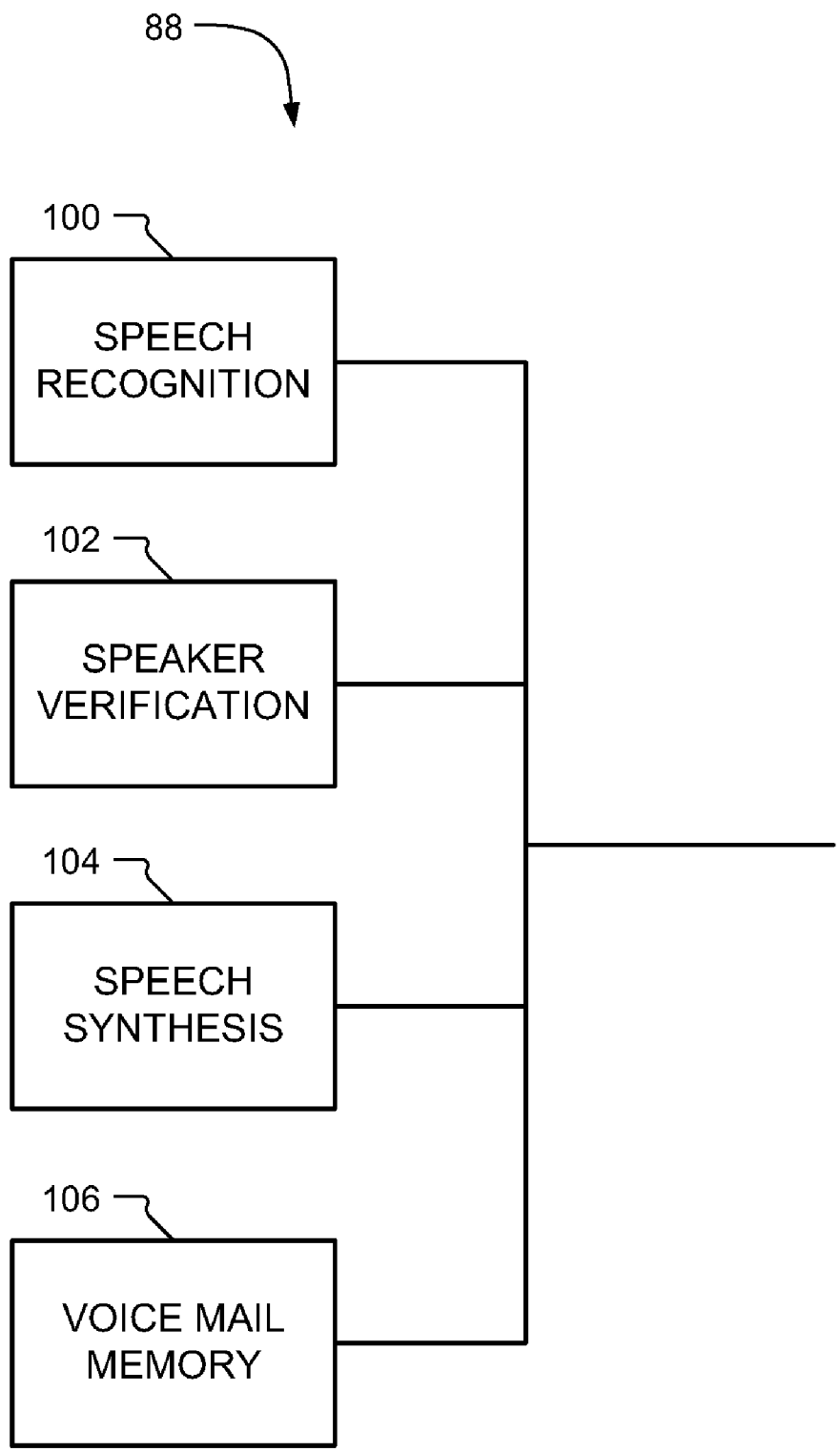
FIG. 4 is a block diagram of a voice processing system in accordance with one embodiment of the invention.

FIG. 4 is a block diagram of a voice processing system 88 in accordance with one embodiment of the invention. The voice processing system contains a speech recognition system 100, a speaker verification system 102, a speech synthesis system 104 and a voice mail memory system 106. The control of the systems of the voice processing system 88 is performed in one embodiment by the processor 78. The processor 78 coordinates the voice system 100-106 to provide machine reception for remote access to the home security system.

Figure 5:
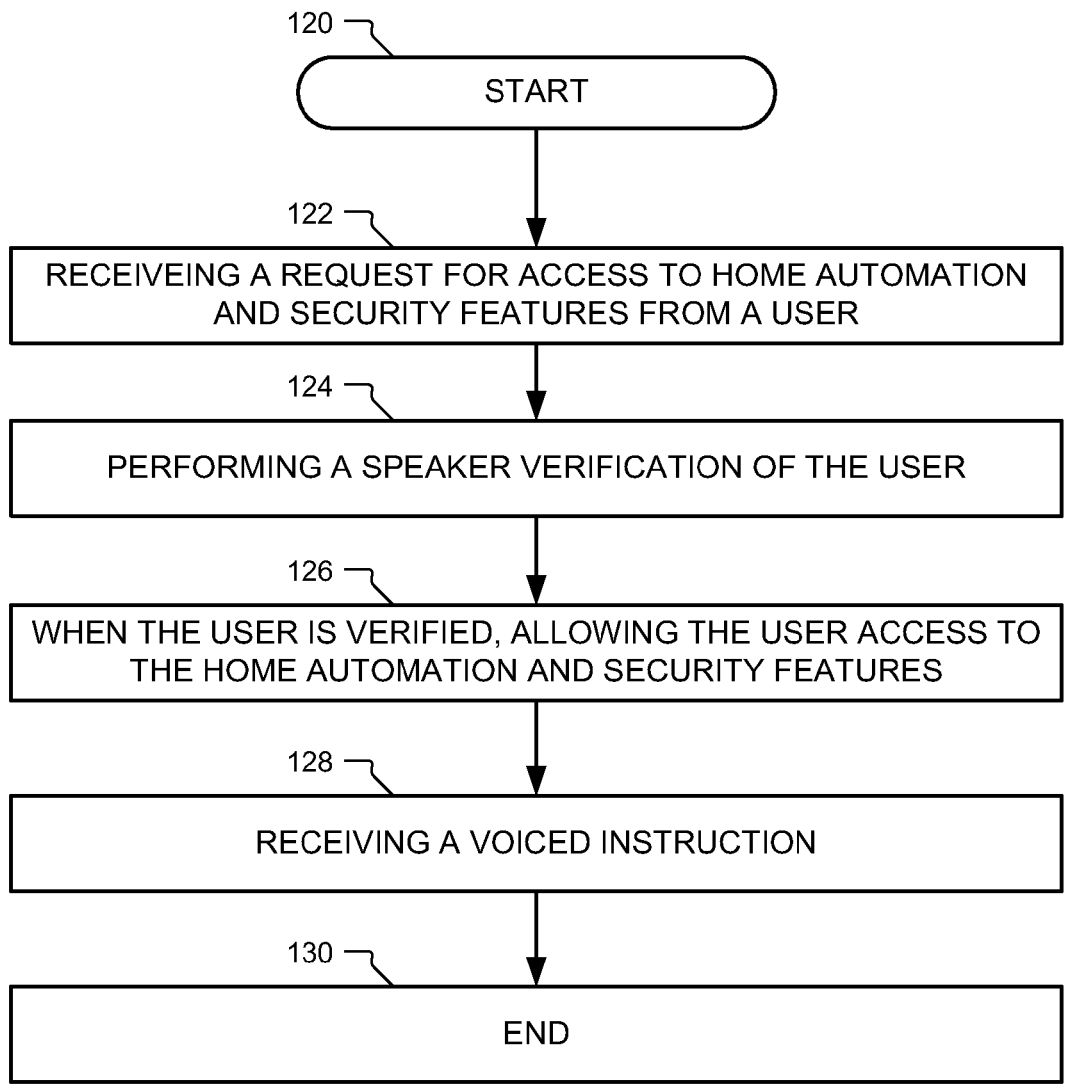
FIG. 5 is a flow chart of the steps used in a home gateway system for home automation and security in accordance with one embodiment of the invention.

FIG. 5 is a flow chart of the steps used in a home gateway system for home automation and security in accordance with one embodiment of the invention. The process starts, step 120, by receiving a request for access to a home automation and security features from a user at step 122. A speaker verification of the user is performed at step 124. When the user is verified, the user is allowed access to the home automation and security features at step 126. At step 128, a voiced instruction is received which ends the process at step 130.

In one embodiment, the step of receiving a request for access to the home automation and security features further includes inputting an electronic address of the home gateway system. Next, an electronic connection is established with the home gateway system. The user is then presented with a plurality of options including the home automation and security features. In one embodiment the step of entering the electronic address, is performed by dialing a phone number. In another embodiment the electronic connection is a wireless local loop telephony connection.

In yet another embodiment the electronic connection is an internet connection and the user clicks on the home automation and security features option. The internet connection can be carried over the wireless local loop or over the cable TV link.

In one embodiment the speaker verification step further includes requesting a user to speak an access code. The access code is recognized using speech recognition. When the access code is valid and belongs to a set of approved access codes, a speaker verification is performed. When the speaker verification fails, the user is requested to enter a personal identification number. When the personal identification is valid, the user is allowed access to the home automation and security features. When the personal identification is not valid the user is denied access to the home automation and security features.

In a further embodiment the voiced instruction is recognized using the speech recognition system. The recognized instruction is converted into an electronic instruction that the home automation and security system can understand. The electronic instruction is then sent to the home automation and security controller.

Figure 6:
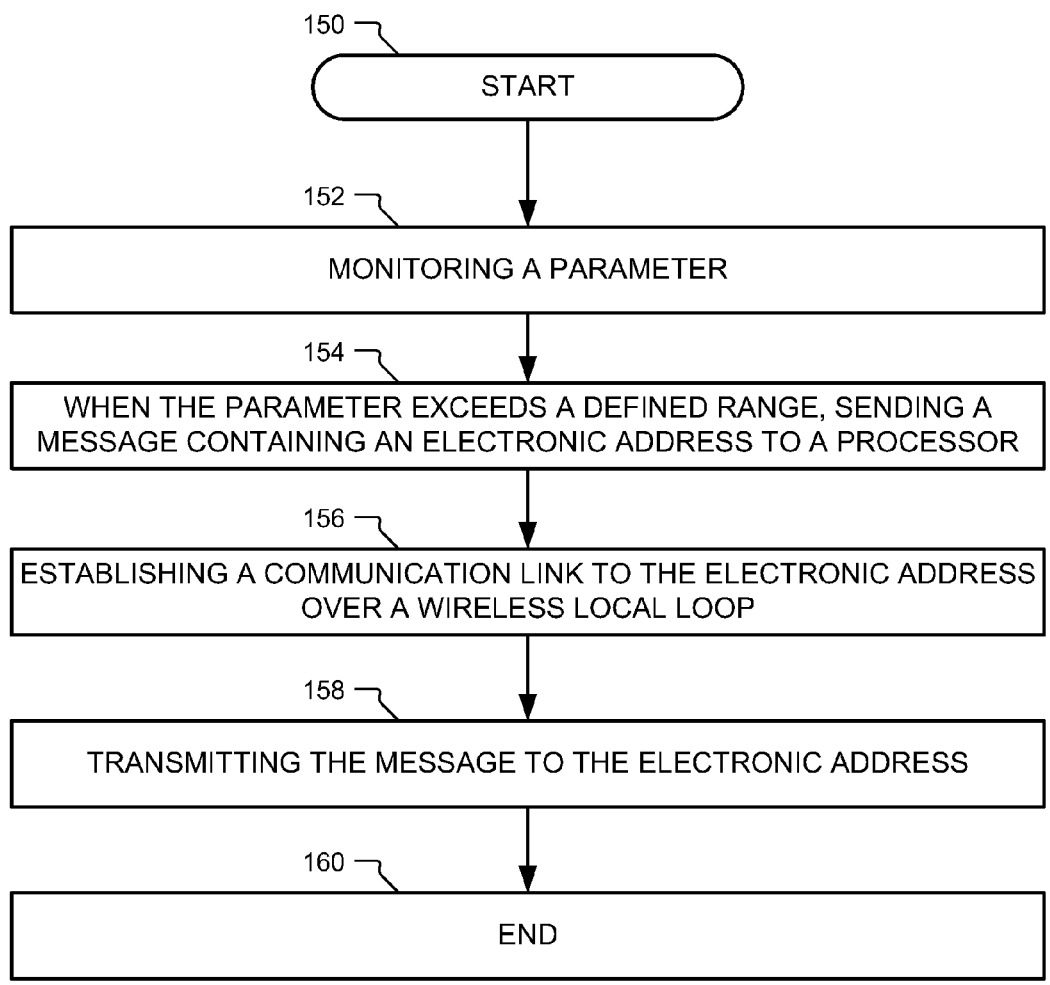
FIG. 6 is a flow chart of the steps used in a home gateway system for home automation and security in accordance with another embodiment of the invention.

FIG. 6 is a flow chart of the steps used in a home gateway system for home automation and security in accordance with another embodiment of the invention. The process starts, step 150, by monitoring a parameter at step 152. When the parameter exceeds a defined range, a message is sent containing an electronic address to a processor at step 154. A communication link to the electronic address is established over a wireless local loop at step 156. At step 158 the message is transmitted to the electronic address, which ends the process at step 160.

In one embodiment the parameter is a forceful entry signal and the message contains a police telephone number. In another embodiment a portion of the message is speech synthesized to form an audio message. The audio message is transmitted to the electronic address. For instances, the audio message could include the street address of house and which sensor was tripped. In addition, the message could tell the police if the owners are home.

In another embodiment the message includes an internet address of the police. A message is sent to a police computer and includes the street address of house and which sensor was tripped. In yet another embodiment the parameters monitored can be an appliance. The data points for the parameter can be sent over the internet to the owner at a remote location. This would allow a homeowner to determine if a sprinkler was left on or the furnace had quit working.

Figure 7:
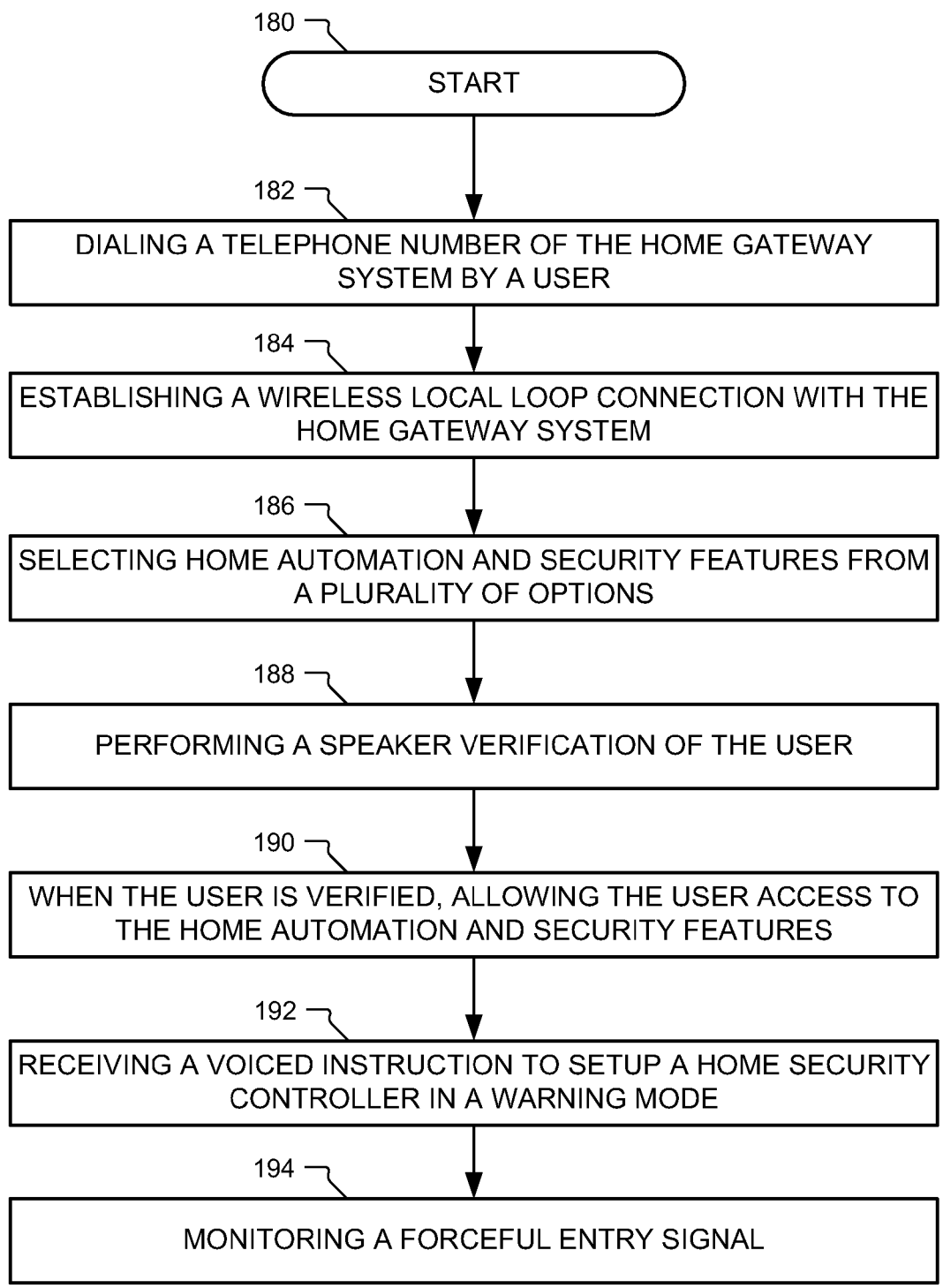
FIGS. 7 & 8 are a flow chart of the steps used in a home gateway system for home automation and security in accordance with another embodiment of the invention.
Figure 8:
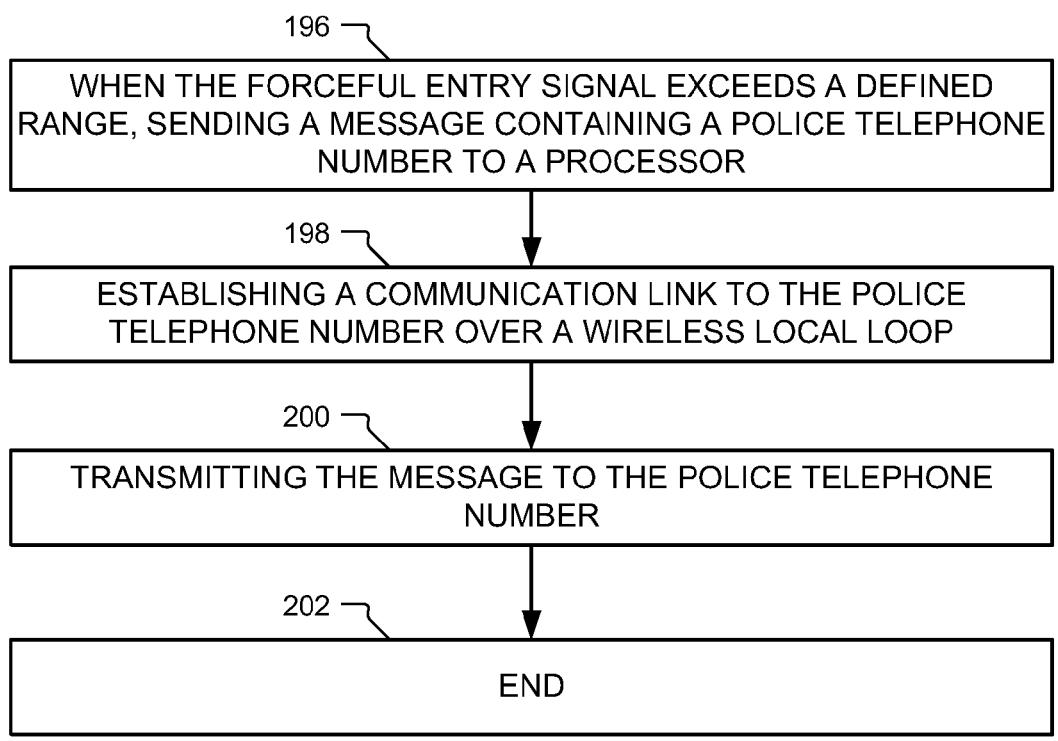

FIGS. 7 & 8 are a flow chart of the steps used in a home gateway system for home automation and security in accordance with another embodiment of the invention. The process starts, step 180, by the user dialing a telephone number of the home gateway system at step 182. A wireless local loop connection is established with the home gateway step at step 184. The user then selects the home automation and security features from a plurality of options at step 186. A speaker verification is performed of the user at step 188. When the user is verified, the user is allowed access to the home automation and security features at step 190. A voice instruction is received from the user to setup the home security controller in a warning mode at step 192. A forceful entry signal is monitored at step 194. When the forceful entry signal exceeds a defined range, a message containing a police telephone number is sent to a processor at step 196. A communication link to the police telephone number is established over wireless local loop at step 198. At step 200, the message is transmitted to the police telephone number, which ends the process at step 202.

Using the invention described herein the communication functions are integrated with a home automation and security system to allow remote access to the home automation and security system. In addition, the home automation and security system can automatically send messages to the police, fire department, hospital or to owner at work.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of operating a home gateway system for home automation and security, comprising:
   receiving a request for access to home automation and security features by a user;
   establishing a wireless local loop connection with the home gateway system;
   selecting home automation and security features from a plurality of options;
   performing a speaker verification of the user;
   when the user is verified, allowing the user access to the home automation and security features;
   receiving a voiced instruction to setup a home security controller in a warning mode;
   monitoring a forceful entry signal;
   when the forceful entry signal exceeds a defined range, sending a message containing a telephone number to a processor;
   establishing a communication link to the telephone number over a wireless local loop; and
   transmitting the message to the telephone number.

2. A method as defined in claim 1, wherein establishing the wireless local loop connection with the home gateway system comprises connecting a wireless local loop transceiver to a base station coupled to a public switched telephone network.

3. A method as defined in claim 1, further comprising requesting the user to enter a personal identification number where the speaker verification fails.

4. A method as defined in claim 1, further comprising requesting the user to speak an access code and performing a speech recognition on the access code.

5. A method as defined in claim 4, wherein the speaker verification of the user is performed when the access code is recognized and belongs to a set of approved access codes.

6. A method as defined in claim 1, wherein the user requests access to the home automation and security features by dialing a telephone number of the home gateway system.

7. A method as defined in claim 1, wherein the forceful entry signal indicates an unwanted intrusion.

8. A method as defined in claim 1, wherein the telephone number is a police telephone number.

9. A method as defined in claim 1, further comprising performing a speech recognition of the voiced instruction, converting the voiced instruction into an electronic instruction, and sending the electronic instruction to a home automation and security controller.

10. A method as defined in claim 1, wherein transmitting the message comprises speech synthesizing a portion of the message to form an audio message and transmitting the audio message to an electronic address.

* * * * *